United States Patent
Sugaya

(10) Patent No.: US 8,098,636 B2
(45) Date of Patent: *Jan. 17, 2012

(54) RADIO TRANSMISSION APPARATUS AND RADIO TRANSMISSION METHOD

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 665 days.

This patent is subject to a terminal disclaimer.

(21) Appl. No.: 11/472,609

(22) Filed: Jun. 22, 2006

(65) Prior Publication Data

US 2006/0251083 A1 Nov. 9, 2006

Related U.S. Application Data

(63) Continuation of application No. 10/083,280, filed on Feb. 25, 2002, now Pat. No. 7,099,300.

(30) Foreign Application Priority Data

Feb. 27, 2001 (JP) .............................. P2001-052756

(51) Int. Cl.
- *H04B 7/212* (2006.01)
- *H04J 3/00* (2006.01)
- *H04L 1/18* (2006.01)

(52) U.S. Cl. ................... 370/337; 370/345; 714/748
(58) Field of Classification Search ............... 370/349
See application file for complete search history.

(56) References Cited

U.S. PATENT DOCUMENTS

| | | | | |
|---|---|---|---|---|
| 4,617,657 A | * | 10/1986 | Drynan et al. | 370/394 |
| 5,432,798 A | * | 7/1995 | Blair | 714/748 |
| 5,528,605 A | * | 6/1996 | Ywoskus et al. | 714/749 |
| 5,570,367 A | * | 10/1996 | Ayanoglu et al. | 370/346 |
| 5,610,595 A | * | 3/1997 | Garrabrant et al. | 340/825.52 |
| 5,684,791 A | * | 11/1997 | Raychaudhuri et al. | 370/310.2 |
| 5,701,311 A | * | 12/1997 | Kapoor | 714/748 |
| 5,729,541 A | * | 3/1998 | Hamalainen et al. | 370/337 |
| 5,905,871 A | | 5/1999 | Buskens et al. | |
| 5,974,028 A | * | 10/1999 | Ramakrishnan | 370/229 |
| 6,157,632 A | * | 12/2000 | Cudak et al. | 370/348 |
| 6,226,301 B1 | * | 5/2001 | Cheng et al. | 370/474 |
| 6,247,059 B1 | | 6/2001 | Johnson et al. | |

(Continued)

FOREIGN PATENT DOCUMENTS

JP 09270798 A 10/1997

(Continued)

OTHER PUBLICATIONS

Office Action from Japanese Application No. 2001-052756, dated Dec. 28, 2010.
Office Action from Japanese Application No. 2001-052756, dated Jun. 15, 2010.

*Primary Examiner* — Daniel J Ryman
*Assistant Examiner* — Cassandra Decker
(74) *Attorney, Agent, or Firm* — Lerner, David, Littenberg, Krumholz & Mentlik, LLP

(57) ABSTRACT

A radio transmission apparatus and a radio transmission method for readily controlling retransmission timing presets a frame cycle for retransmission, and transmits only packets for which no acknowledgement of receipt has been received within the frame cycle as a reply from a receiving apparatus to a transmitting apparatus. Thus, timing for retransmission can be readily determined. Also, the retransmission timing is determined based on when a packet is actually transmitted. Therefore, the multiple acknowledgement of receipt can be returned as a combined reply.

6 Claims, 11 Drawing Sheets

U.S. PATENT DOCUMENTS

| | | |
|---|---|---|
| 6,269,080 B1 | 7/2001 | Kumar |
| 6,314,101 B1 * | 11/2001 | Rezaiifar et al. .............. 370/394 |
| 6,621,796 B1 * | 9/2003 | Miklos ......................... 370/236 |
| 6,947,446 B2 * | 9/2005 | LoGalbo et al. .............. 370/468 |

FOREIGN PATENT DOCUMENTS

| | | |
|---|---|---|
| JP | 2000069547 A | 3/2000 |
| JP | 2001016209 A | 1/2001 |
| JP | 2002190813 A | 7/2002 |

* cited by examiner

FIG. 5

CONTROL TABLE OF TRANSMISSION POINTER VALUES AT END OF FRAMES

| Fr | #71 | #72 | #73 | #74 | #75 | #76 | #77 | #78 | #79 | #80 | #81 | #82 | #83 | #84 | #85 | #86 | #87 | #88 |
|----|-----|-----|-----|-----|-----|-----|-----|-----|-----|-----|-----|-----|-----|-----|-----|-----|-----|-----|
| 0  | 100 | 101 | 105 | 106 | 106 | 106 | 106 | 108 | 108 | 110 | 113 | 113 | 113 | 117 | 119 | 119 | 120 | 120 |
| 1  |     | 100 | 101 | 105 | 106 | 106 | 106 | 106 | 108 | 108 | 110 | 113 | 113 | 113 | 117 | 119 | 119 | 120 |
| 2  |     |     | 100 | 101 | 105 | 106 | 106 | 106 | 106 | 108 | 108 | 110 | 113 | 113 | 113 | 117 | 119 | 119 |
| 3  |     |     |     | 100 | 101 | 105 | 106 | 106 | 106 | 106 | 108 | 108 | 110 | 113 | 113 | 113 | 117 | 119 |
| 4  |     |     |     |     | 100 | 101 | 105 | 106 | 106 | 106 | 106 | 108 | 108 | 110 | 113 | 113 | 113 | 117 |
| 5  |     |     |     |     |     | 100 | 101 | 105 | 106 | 106 | 106 | 106 | 108 | 108 | 110 | 113 | 113 | 113 |
| 6  |     |     |     |     |     |     | 100 | 101 | 105 | 106 | 106 | 106 | 106 | 108 | 108 | 110 | 113 | 113 |
| 7  |     |     |     |     |     |     |     | 100 | 101 | 105 | 106 | 106 | 106 | 106 | 108 | 108 | 110 | 113 |
| 8  |     |     |     |     |     |     |     |     | 100 | 101 | 105 | 106 | 106 | 106 | 106 | 108 | 108 | 110 |
| 9  |     |     |     |     |     |     |     |     |     | 100 | 101 | 105 | 106 | 106 | 106 | 106 | 108 | 108 |
| 10 |     |     |     |     |     |     |     |     |     |     | 100 | 101 | 105 | 106 | 106 | 106 | 106 | 108 |
| 11 |     |     |     |     |     |     |     |     |     |     |     | 100 | 101 | 105 | 106 | 106 | 106 | 106 |
| 12 |     |     |     |     |     |     |     |     |     |     |     |     | 100 | 101 | 105 | 106 | 106 | 106 |
| 13 |     |     |     |     |     |     |     |     |     |     |     |     |     | 100 | 101 | 105 | 106 | 106 |
| 14 |     |     |     |     |     |     |     |     |     |     |     |     |     |     | 100 | 101 | 105 | 106 |
| 15 |     |     |     |     |     |     |     |     |     |     |     |     |     |     |     | 100 | 101 | 105 |
| 16 |     |     |     |     |     |     |     |     |     |     |     |     |     |     |     |     | 100 | 101 |

RADIO TRANSMISSION APPARATUS AND RADIO TRANSMISSION METHOD

CROSS-REFERENCE TO RELATED APPLICATIONS

The present application is a continuation of U.S. application Ser. No. 10/083,280 filed Feb. 25, 2002, which claims the benefit of Japanese application P2001-052756, filed Feb. 27, 2001, the disclosures of which are hereby incorporated herein by reference.

BACKGROUND OF THE INVENTION

The present invention relates to a radio transmission apparatus and a radio transmission method for transmitting various information by a radio signal, for example, between a plurality of communication terminals.

As a conventional method of retransmission control in radio transmission, a method has been used which starts a timer after transmitting information, and retransmits the information whose receipt acknowledging information has not been transmitted from an information receiver before time-out of the timer.

Also, consideration has recently been given to a method which packetizes information to be transmitted by an information transmitter into predetermined size and transmits resulting packets by radio, and reconstructs the original information by collecting the packets at an information receiver.

The method has been considered for use in conjunction with a selective retransmission type automatic retransmission control method (SR-ARQ system), which transmits information that the information receiver has successfully received a packet to the information transmitter as receipt acknowledging information, and selects and retransmits only an unreceived packet from the information transmitter.

In addition, as a conventional method of packet transmission, a retransmission method capable of dealing with a burst error in a transmission line has been realized which, in retransmission control, waits for a reply of receipt acknowledging information from the information receiver over a certain long period of time, and then retransmits a packet whose receipt acknowledging information has not been received.

Furthermore, as a conventional technique, a method has been proposed which prevents unlimited retransmissions of packets by setting a finite number of retransmissions.

By setting such a limit on the number of retransmissions, it is possible to use the same sequence number repeatedly, and thus make efficient transmission.

Furthermore, when using the conventional selective retransmission type automatic retransmission control method, by returning a certain amount of receipt acknowledging information in one transmission, it is possible to reduce packets, which represent the number of pieces of information flowing in a radio transmission line, and thus reduce information traffic.

Such conventional retransmission control methods need to start a timer every time information is transmitted. Therefore, when information is packetized for transmission, a timer needs to be started for each packet.

Also, with a method of retransmission after waiting for a certain long period of time, when a time for retransmission is to be controlled by software, it is difficult for the software to determine that an access right on a transmission line has been obtained. Therefore, there occurs a time difference between a time when a timer is started and a time when a packet is actually transmitted, and thus the time when a timer is started cannot be used for precise retransmission control.

In addition, the conventional retransmission method using a timer needs to handle a time of a retransmitted packet. Therefore, a timer needs to be started for each packet so as to handle its time.

Moreover, in addition to control of a time for retransmission, it is necessary to handle a time for discarding a packet whose receipt acknowledging information has not been received after repeated retransmissions.

Furthermore, when using the conventional selective retransmission type automatic retransmission control method and returning a certain amount of receipt acknowledging information in one transmission, it is necessary to define a time for integrating the receipt acknowledging information. This reduces a degree of freedom in designing transmission apparatus, and makes it impossible to secure compatibility between apparatus of different manufacturers.

Furthermore, even if the time for integrating the receipt acknowledging information is defined, the receipt acknowledging information cannot be returned unless an access control right is obtained. Therefore, a time required obtaining the access control right needs to be set as a redundant time, and thus the time for integrating the receipt acknowledging information needs to be reduced in effect.

SUMMARY OF THE INVENTION

The present invention has been made in view of the above, and it is accordingly an object of the present invention to provide a radio transmission apparatus and a radio transmission method that can readily control retransmission timing.

According to a first aspect of the invention, there is provided a radio transmission method for transmitting a packet from a radio transmission apparatus serving as an information transmitter to a radio transmission apparatus serving as an information receiver, returning receipt acknowledging information of a received packet from the radio transmission apparatus serving as the information receiver to the radio transmission apparatus serving as the information transmitter after transmission of information, and retransmitting an unreceived packet from the radio transmission apparatus serving as the information transmitter to the radio transmission apparatus serving as the information receiver in a wireless network, the wireless network being formed with a plurality of transmission apparatus serving as communication stations, the radio transmission method including the steps of:

on a side of the radio transmission apparatus serving as the information transmitter, setting a predetermined transmission frame cycle;

presetting a frame cycle for retransmission; and automatically retransmitting only a packet whose receipt acknowledging information has not been received on arrival of the frame cycle for retransmission.

With this configuration, the radio transmission method according to the present invention predetermines a frame cycle for retransmission, and retransmits only a packet whose receipt acknowledging information has not been received on arrival of the frame cycle. The radio transmission method according to the present invention thereby eliminates the need for starting a timer after transmitting information and controlling the timer for each packet as in the conventional method. Therefore, it is possible to readily determine timing for retransmission. In addition, the retransmission timing is determined on the basis of timing in which a packet is actually transmitted. Therefore, the radio transmission method according to the present invention provides a most desirable radio transmission method allowing pieces of receipt acknowledging information to be combined into one reply.

According to a second aspect of the invention, there is provided a radio transmission method for transmitting a packet from a radio transmission apparatus serving as an information transmitter to a radio transmission apparatus serving as an information receiver, returning receipt acknowledging information of a received packet from the radio transmission apparatus serving as the information receiver to the radio transmission apparatus serving as the information transmitter after transmission of information, and retransmitting an unreceived packet from the radio transmission apparatus serving as the information transmitter to the radio transmission apparatus serving as the information receiver in a wireless network, the wireless network being formed with a plurality of transmission apparatus serving as communication stations, the radio transmission method including the steps of:

on a side of the radio transmission apparatus serving as the information transmitter, setting a predetermined transmission frame cycle;

entering a sequence number of a last packet transmitted in the frame cycle as a transmission pointer value of the frame; and referring to the transmission pointer value of a frame cycle for retransmission in each the frame cycle and automatically retransmitting only a packet whose receipt acknowledging information has not been received.

With this configuration, the radio transmission method according to the present invention enters a sequence number of a last packet transmitted in the frame cycle as a transmission pointer value of the frame, refers to a transmission pointer value of a frame cycle for retransmission in each frame cycle, and automatically retransmits only a packet whose receipt acknowledging information has not been received. Thus, it is possible to readily determine timing for retransmission.

Preferably, in a radio transmission method according to a first aspect of the invention, the frame cycle for retransmission is preset to an arbitrary frame cycle depending on size of an asynchronous transmission area available for asynchronous transmission in a radio transmission line allowing band-reserved transmission or band-secured transmission.

With this configuration, the radio transmission method according to the present invention can set a retransmission cycle arbitrarily. Therefore, it is possible to change retransmission timing freely according to traffic of the transmission line, and thus make retransmission efficiently according to a condition of the transmission line.

Preferably, in a radio transmission method according to a first aspect of the invention, the predetermined number of retransmissions are set, and then retransmission is made the number of retransmissions.

With this configuration, the radio transmission method according to the present invention can set the number of retransmissions arbitrarily. Therefore, it is possible to set the number of retransmissions arbitrarily according to packets to be transmitted and traffic of the transmission line, and thus make retransmission efficiently.

Preferably, in a radio transmission method according to a first aspect of the invention, a frame cycle for discarding unreceived packets is preset, and a packet whose receipt acknowledging information has not been returned until the frame cycle is discarded.

With this configuration, the radio transmission method according to the present invention presets a frame cycle for discarding unreceived packets, and discards a packet whose receipt acknowledging information has not been returned until the frame cycle. Therefore, it is possible to prevent unnecessary retransmission. In addition, by repeatedly using a buffer area for storing packets for retransmission and a sequence number, it is possible to reduce processing.

Preferably, in a radio transmission method according to a second aspect of the invention, the sequence number of the last packet transmitted in the frame cycle is entered as the transmission pointer value of the frame; and the transmission pointer value of a frame cycle for discarding packets is referred to in each the frame cycle and a packet whose receipt acknowledging information has not been received is discarded.

With this configuration, the radio transmission method according to the present invention enters a sequence number of a last packet transmitted in the frame cycle as a transmission pointer value of the frame, and discards a packet whose receipt acknowledging information has not been received by referring to a transmission pointer value of a frame cycle to discard the packet in each frame cycle. In addition, by repeatedly using a buffer area for storing packets for retransmission and a sequence number, it is possible to reduce processing.

According to a third aspect of the invention, there is provided a radio transmission apparatus for transmitting information in a wireless network, the wireless network being formed with a plurality of communication apparatus serving as communication stations, the radio transmission apparatus including:

packetizing means for packetizing asynchronous information into packets as predetermined information units on the wireless network;

transmitting means for transmitting the packets under predetermined access control;

receiving means for receiving receipt acknowledging information from a radio transmission apparatus serving as an information receiver;

frame cycle setting means for setting a predetermined transmission frame cycle;

timing means for timing the frame cycle;

retransmission frame cycle setting means for presetting a frame cycle for retransmission; and retransmitting means for automatically retransmitting only a packet whose receipt acknowledging information has not been received on arrival of the frame cycle for retransmission.

With this configuration, the radio transmission apparatus according to the present invention has a function of setting a predetermined frame cycle and presetting a frame cycle for retransmission, and has a function of retransmitting only a packet whose receipt acknowledging information has not been received on arrival of the frame cycle. Therefore, it is possible to realize a radio transmission apparatus capable of simple retransmission control.

According to a fourth aspect of the invention, there is provided a radio transmission apparatus for transmitting information in a wireless network, the wireless network being formed with a plurality of communication apparatus serving as communication stations, the radio transmission apparatus including:

packetizing means for packetizing asynchronous information into packets as predetermined information units on the wireless network;

transmitting means for transmitting the packets under predetermined access control;

receiving means for receiving receipt acknowledging information from a radio transmission apparatus serving as an information receiver;

frame cycle setting means for setting a predetermined transmission frame cycle;

transmission pointer recording means for recording a sequence number of a last packet transmitted in the frame cycle as a transmission pointer value of the frame;

timing means for timing the frame cycle;

retransmission frame cycle setting means for presetting a frame cycle for retransmission; and retransmitting means for referring to the transmission pointer value of the frame cycle for retransmission in each the frame cycle and automatically retransmitting only a packet whose receipt acknowledging information has not been received.

With this configuration, the radio transmission apparatus according to the present invention has a function of setting a predetermined frame cycle and recording a sequence number of a last packet transmitted in the frame cycle as a transmission pointer value of the frame, and has a function of automatically retransmitting only a packet whose receipt acknowledging information has not been received from a transmitter of the information by referring to the transmission pointer value of the frame cycle for retransmission in each frame cycle. Therefore, it is possible to realize a radio transmission apparatus capable of simple retransmission control.

According to a fifth aspect of the invention, there is provided a radio transmission apparatus for transmitting information in a wireless network, the wireless network being formed with a plurality of communication apparatus serving as communication stations, the radio transmission apparatus including:

packetizing means for packetizing asynchronous information into packets as predetermined information units on the wireless network;

transmitting means for transmitting the packets under predetermined access control;

receiving means for receiving receipt acknowledging information from a radio transmission apparatus serving as an information receiver;

frame cycle setting means for setting a predetermined transmission frame cycle;

timing means for timing the frame cycle;

discarding frame cycle setting means for presetting a frame cycle for discarding packets; and discarding means for discarding a packet whose receipt acknowledging information has not been received on arrival of the frame cycle for discarding packets.

With this configuration, the radio transmission apparatus according to the present invention has a function of setting a predetermined frame cycle and presetting a frame cycle for discarding unreceived packets, and discards a packet whose receipt acknowledging information has not been received on arrival of the frame cycle. In addition, by repeatedly using a buffer area for storing packets to be discarded and a sequence number, it is possible to reduce processing.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a diagram showing an arrangement of a transmission pointer control table;

DETAILED DESCRIPTION OF THE PREFERRED EMBODIMENT

A preferred embodiment of the present invention will hereinafter be described.

A radio transmission method according to the present embodiment as a method for control of automatic retransmission of packets provides a transmission frame cycle, sets a frame cycle for retransmission in advance, handles a sequence number of a last packet transmitted in the frame cycle as a transmission pointer, and retransmits only a packet whose receipt acknowledging information has not been received on arrival of a retransmission frame cycle.

Figure 1:
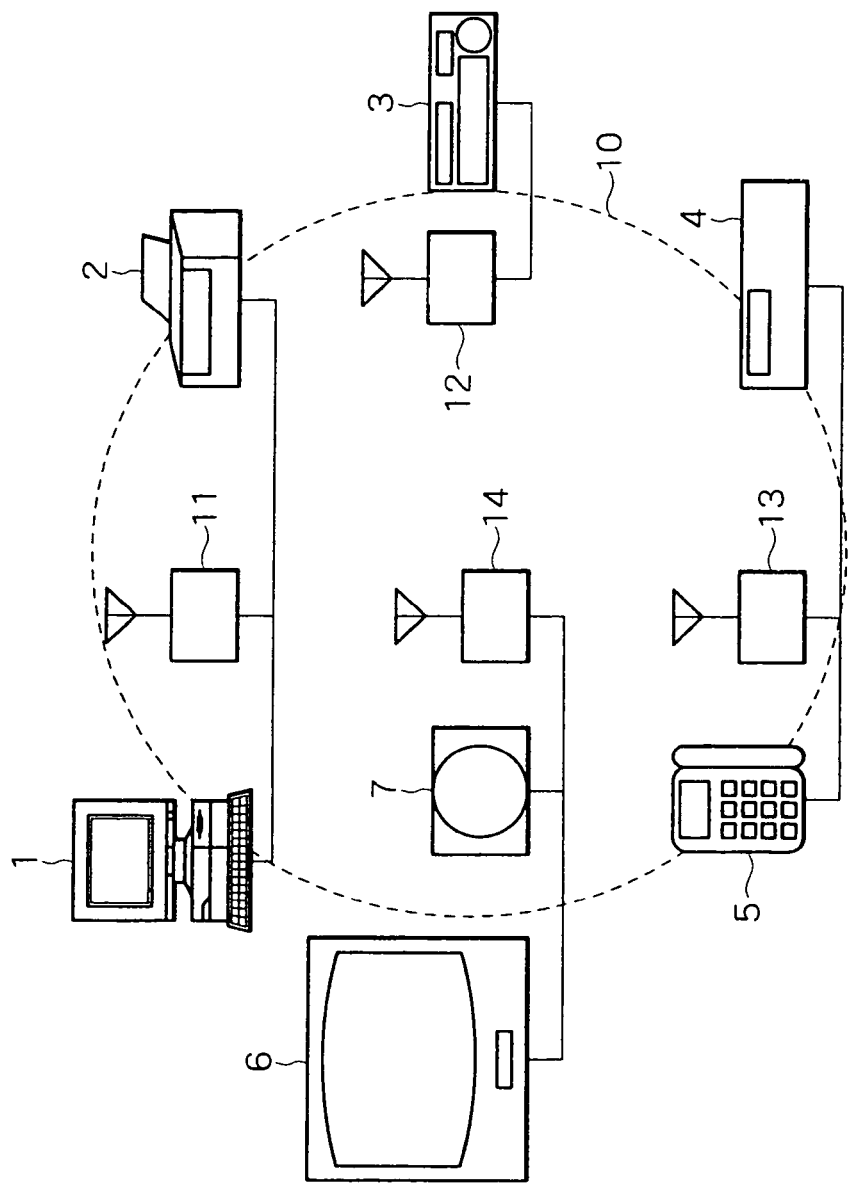
FIG. 1 is a diagram showing a configuration of a wireless network applied to an embodiment of the present invention.

The present embodiment will hereinafter be described. FIG. 1 is a diagram showing a configuration of a network system to which the radio transmission method according to the present embodiment is applied.

As shown in FIG. 1, for example, a radio transmission apparatus 11 is wired to a personal computer 1 and a printer output apparatus 2 via a cable or the like. Similarly, a radio transmission apparatus 12 is wired to a VTR 3 via a cable or the like. Similarly, a radio transmission apparatus 13 is wired to a set top box 4 and a telephone apparatus 5 via a cable or the like. Similarly, a radio transmission apparatus 14 is wired to a television receiver 6 and a game apparatus 7 via a cable or the like.

Thus, the apparatus are connected to their respective radio transmission apparatus, and the radio transmission apparatus form a network 10.

In this case, the radio transmission apparatus 11 to 14 are associated with each other as communication stations #1 to #4, respectively, thus forming a wireless network.

The radio transmission apparatus 14 can be present at a center of the network 10 to be thereby capable of communication with all of the other communication apparatus. Accordingly, for convenience, the radio transmission apparatus 14 serves as a control station of the network 10 to define a frame cycle, send a predetermined access control signal, and handle band reserving information. The other radio transmission apparatus 11 to 13 serve as communication stations.

Figure 2:
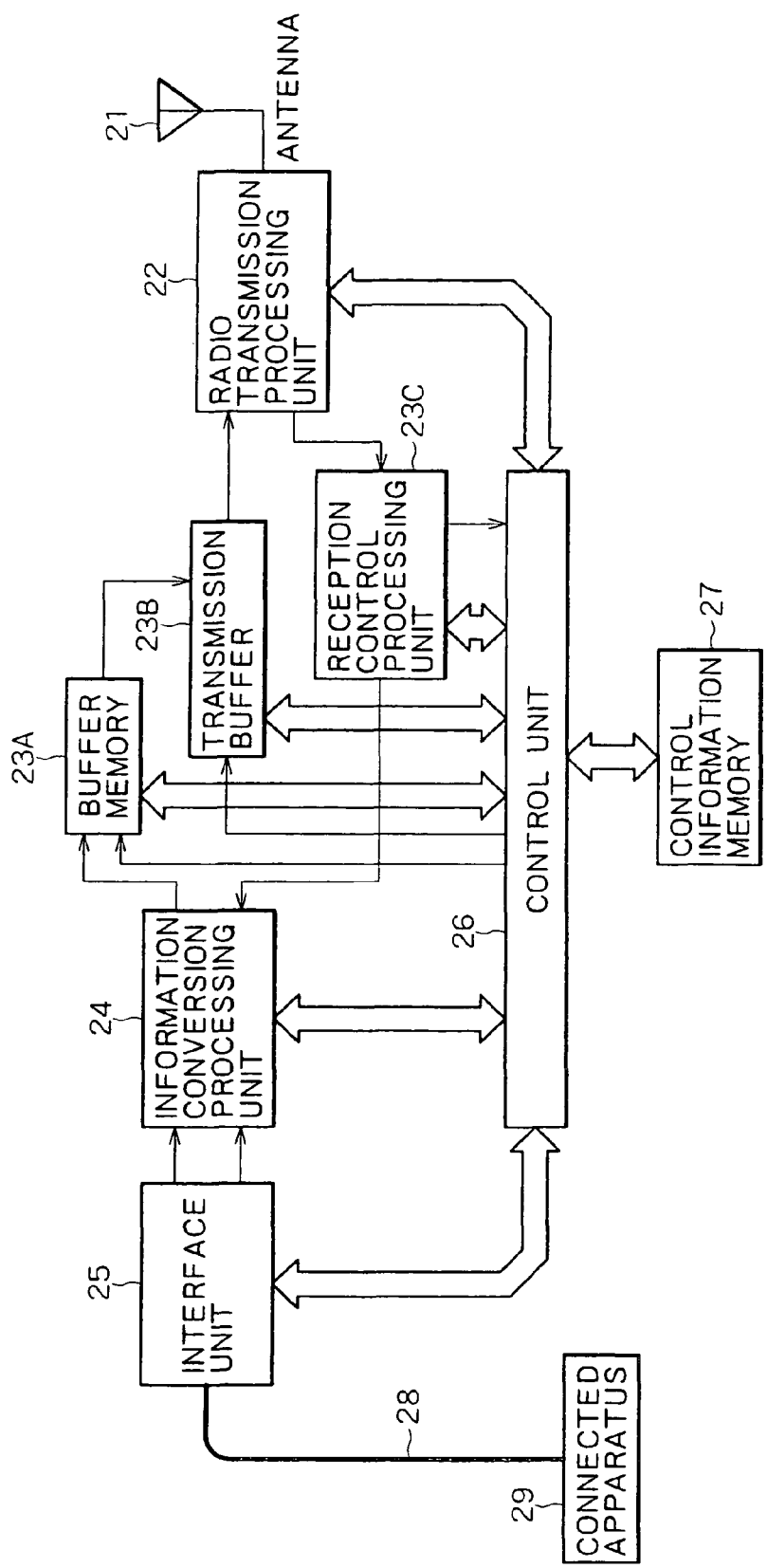
FIG. 2 is a block diagram showing a configuration of a radio transmission apparatus.

FIG. 2 shows a configuration of the radio transmission apparatus 11 to 14 forming the communication stations.

In this case, the radio transmission apparatus 11 to 14 basically have a common configuration. The radio transmission apparatus 11 to 14 each have an antenna 21 for transmission and reception, and a radio transmission processing unit 22 connected to the antenna 21 for performing radio transmission processing and radio reception processing. Thereby the radio transmission apparatus 11 to 14 can each make radio transmission with the other transmission apparatus.

In this case, a transmission method using a multicarrier signal referred to as an OFDM (Orthogonal Frequency Division Multiplex) method, for example, is used as a transmission method for transmission and reception by the radio transmission processing unit 22 in this example. A very high frequency band (for example a 5-GHz band) is used as frequencies for transmission and reception.

In this case, a relatively weak output is set as transmission output; for indoor use, for example, the output is set so as to enable radio transmission for a relatively short distance of a few meters to a few tens of meters. The output may be adjusted as required.

The radio transmission processing unit 22 has a function of detecting a specific frequency carrier on a radio transmission line and a function of detecting a synchronizing signal. When the radio transmission processing unit 22 has received the synchronizing signal, the radio transmission processing unit 22 receives an information portion succeeding the synchronizing signal.

The radio transmission apparatus further includes: a reception control processing unit 23C for reception and decoding of various transmission information of a signal received by the radio transmission processing unit 22; a buffer memory 23A for storing packet information required to be transmitted by the radio transmission processing unit 22; and a transmission buffer 23B for storing a packet that may be transmitted after an access control right is obtained.

The radio transmission apparatus further includes an information conversion processing unit 24 for carrying out data conversion of a packet information signal of the signal received by the reception control processing unit 23C, and also making data conversion into packet information to be stored in the buffer memory 23A for transmission by the radio transmission processing unit 22.

Furthermore, the data converted by the information conversion processing unit 24 is supplied to a connected apparatus 29 via an interface unit 25, and data supplied from the connected apparatus 29 is supplied to the information conversion processing unit 24 via the interface unit 25 to be subjected to conversion processing.

In this case, an external interface of the interface unit 25 of the radio transmission apparatus is configured to be able to transmit and receive audio and video information, or various data information to and from the connected apparatus 29 via a high-speed serial bus 28 in IEEE1394 format, for example.

Alternatively, the radio transmission apparatus may be incorporated within the body of the connected apparatus 29.

Each part within each of the radio transmission apparatus is configured to perform processing under control of a control unit 26 formed by a microcomputer or the like.

Information captured by the information conversion processing unit 24 via the interface unit 25 which information is required to be transmitted asynchronously is packetized into predetermined fragment size, and packets of up to a receipt acknowledging (ACK) reception pointer value −1 to be described later are stored in the buffer memory 23A as packet information.

Packet information from a transmission pointer value to sequence window size, which information can be transmitted by an access control right to be described later, is stored from the buffer memory 23A into the transmission buffer 23B.

When the signal decoded by the reception control processing unit 23C of the transmission apparatus is packet information directed to the transmission apparatus itself, the packet information is stored in the information conversion processing unit 24. Also, the control unit 26 makes determination, constructs receipt acknowledging (ACK) information, and stores the receipt acknowledging (ACK) information as a packet in the transmission buffer 23B.

When the signal decoded by the reception control processing unit 23C of the transmission apparatus is receipt acknowledging (ACK) information, the receipt acknowledging (ACK) information is stored in the control unit 26. The control unit 26 enters the packet including the received receipt acknowledging (ACK) information by the resetting of a transmitted bit map in a control information memory 27.

The transmission apparatus 14 serving as the control station constructs an access control signal (transmission permitting signal) for setting a right to transmission from each of the transmission apparatus in an asynchronous transmission area, and then supplies the access control signal from the control unit 26 to the radio transmission processing unit 22 for radio transmission.

When a signal received by the radio transmission apparatus 11, 12, or 13 other than the control station is an access control signal (transmission permitting signal), the radio transmission apparatus supplies the signal from the reception control processing unit 23C to the control unit 26, and then the control unit 26 analyzes the access control signal (transmission permitting signal). When the transmission apparatus obtains the transmission right, the transmission apparatus performs processing for transmitting information from the transmission buffer 23B. At this point, a sequence number of a transmitted packet is set in the transmitted bit map in the control information memory 27.

When the signal decoded by the reception control processing unit 23C is information in a control information transmitting area, the control unit 26 sets each part to a state indicated by the information of the received control signal.

The control unit 26 is connected with the control information memory 27. The control information memory 27 is configured to temporarily store data necessary for communication control, information on the number of communication stations forming the network and a method of using a transmission line and the like.

In addition, the radio transmission apparatus 14 serving as the control station supplies a synchronizing signal of outbound control information (FS) to be sent to the transmission apparatus 11, 12, and 13 other than the control station from the control unit 26 to the radio transmission processing unit 22 for radio transmission.

When a signal received by the transmission apparatus 11, 12, or 13 other than the control station is a synchronizing signal of outbound control information (FS), the control unit 26 determines timing of receiving the synchronizing signal, and sets a frame cycle based on the synchronizing signal to perform communication control processing in the frame cycle.

When the frame cycle is ended, each of the transmission apparatus stores a transmission pointer value to be described later in the control information memory 27 as last transmission pointer information in the frame.

On arrival of a preset frame cycle in which retransmission is to be made, the control unit 26 makes determination to select from the buffer memory 23A a packet whose receipt acknowledging (ACK) information has not been received, by referring to the transmitted bit map in the control information memory 27, and then stores the packet in the transmission buffer 23B for automatic retransmission.

Figure 3:
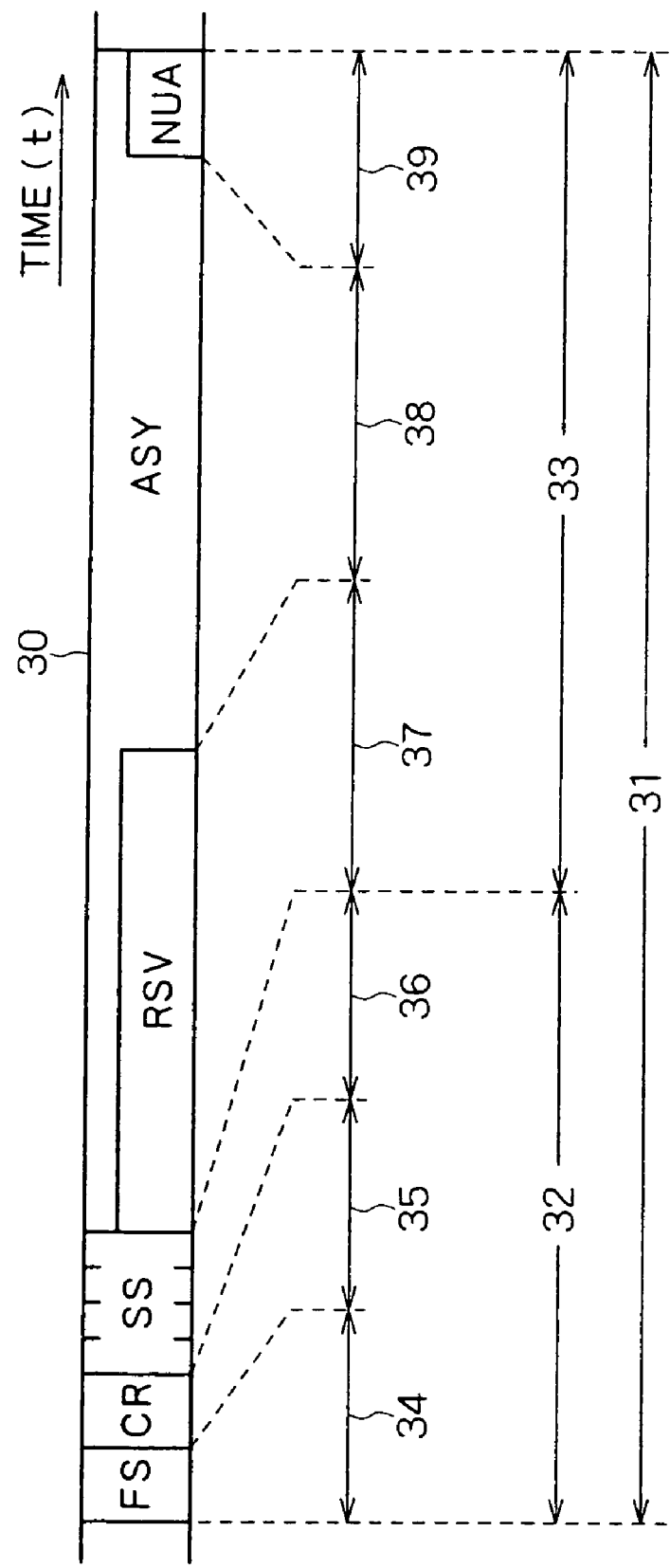
FIG. 3 is a diagram showing a configuration of a radio transmission frame.

FIG. 3 is a diagram showing an arrangement of a radio transmission frame according to the present embodiment. While the figure shows the frame defined for convenience, the frame does not necessarily need to have such a frame structure. FIG. 3 shows the defined transmission frame arriving in each given transmission frame cycle 31 in a radio transmission line 30, which frame includes a control information transmitting area 32 and an information transmitting area 33.

An outbound control information transmitting section 34 (FS: Frame Start) for frame synchronization and sending common network information is disposed at the head of the frame, followed by a temporal information correction transmitting section 35 (CR: Cycle Report) disposed as required, and further a station synchronizing signal transmitting and receiving section 36 (SS: Station Sync).

The outbound control information transmitting section (FS) is used to transmit necessary information shared in the network from the control station, and is formed by a fixed length area and a variable length area.

The fixed length area specifies the number of communication stations for transmission in the station synchronizing signal transmitting and receiving section (SS) and specifies the number of band reservation transmitting areas (RSV) to determine length of the variable length area, and the variable length area specifies the communication stations for transmission in the station synchronizing signal transmitting and receiving section (SS) and specifies the band reservation transmitting areas (RSV).

The station synchronizing signal transmitting and receiving section (SS) has a predetermined length and is configured to allot a transmitting communication station to each of the communication stations forming the network with a certain cycle by the outbound control information.

For example, by receiving all portions of the station synchronizing signal transmitting and receiving section (SS) other than a portion transmitted by a station, the station can grasp a state of a connection link with a communication station present around the station.

Furthermore, when a next station reports a state of a connection link in information transmitted in the station synchronizing signal transmitting and receiving section (SS), each of the communication stations can grasp a connection state of the network.

The information transmitting area 33 is formed by a band reservation transmitting area (RSV: Reserve) 37 set as required, an asynchronous transmission area (ASY: Asynchronous) 38 under centralized transmission control of the control station, and an unused area (NUA: Not Using Area) 39 that is not under transmission control of the control station and is allowed to be used by another radio system or the like.

Hence, when the band reservation transmitting area (RSV) and the unused area (NUA) are not required, all of the information transmitting area 33 can be transmitted as the asynchronous transmission area (ASY) 38 under centralized control.

It is preferable that with such a frame structure, isochronous transmission defined by IEEE1394 format, for example, is made in the band reservation transmitting area (RSV) 37, and asynchronous transmission is made in the asynchronous transmission area (ASY) 38.

Operation of the thus formed radio transmission apparatus according to the present embodiment will be described in the following.

Figure 4:
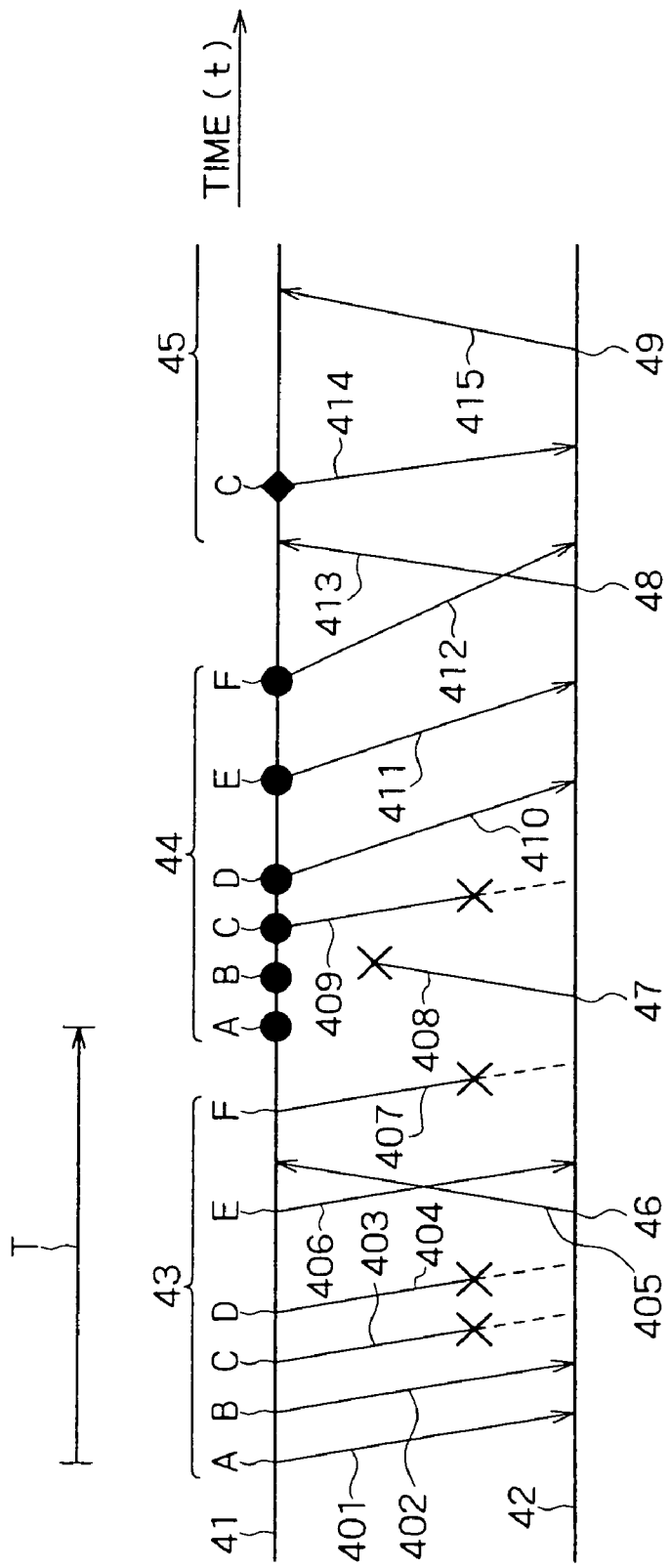
FIG. 4 is a diagram showing a sequence of transmission of asynchronous information.

FIG. 4 is a diagram showing a sequence of transmission of asynchronous transmission packets according to the present embodiment. The figure shows that a retransmission frame cycle is predetermined before transmitting a packet, and a packet whose receipt acknowledging (ACK) information has not been received by the frame cycle is retransmitted.

Suppose that as shown in a packet transmission 43 in FIG. 4, transmissions 401 to 407 of pieces of packet information A to F are made from a transmitting apparatus 41 to a receiving apparatus 42 under predetermined access control.

In this case, suppose that the pieces of packet information C403, D404, and F407 did not reach the receiving apparatus 42 correctly.

Next, an ACK information reply 405 denoted by 46 for notifying reception of the pieces of packet information A401 and B402 is made from the receiving apparatus 42 to the transmitting apparatus 41.

When the transmitting apparatus 41 has received the ACK information reply 405, the transmitting apparatus 41 stores the packets received by the receiving apparatus 42.

In addition, FIG. 4 shows a state in which an ACK information reply 408 denoted by 47 for notifying reception of the piece of packet information E406 was made from the receiving apparatus 42 to the transmitting apparatus 41, but the transmitting apparatus 41 was unable to receive the information.

On arrival of a predetermined retransmission frame cycle T, the transmitting apparatus 41 determines whether there are packets not received by the receiving apparatus 42, and then retransmits unreceived packet information.

In FIG. 4, a retransmission 44 of unreceived packets indicated by black solid circles denotes the retransmission frame cycle T. While a black solid circle A in the unreceived packet retransmission 44 denotes the packet information A401 in the retransmission frame cycle T, and a black solid circle B in the unreceived packet retransmission 44 denotes the packet information B402 in the retransmission frame cycle T, the black solid circles A and B indicate that the transmitting apparatus 41 has already received the ACK information reply 405 for the packets, and therefore the packets will not be retransmitted.

A black solid circle C in the unreceived packet retransmission 44 denotes the packet information C403 in the retransmission frame cycle T. The transmitting apparatus 41 has not received ACK information for the packet information C403, and therefore makes a packet information retransmission C409 in the unreceived packet retransmission 44.

A black solid circle D in the unreceived packet retransmission 44 denotes the packet information D404 in the retransmission frame cycle T. The transmitting apparatus 41 has not received ACK information for the packet information D404, and therefore makes a packet information retransmission D410 in the unreceived packet retransmission 44.

A black solid circle E in the unreceived packet retransmission 44 denotes the packet information E406 in the retransmission frame cycle T. The transmitting apparatus 41 has not received ACK information for the packet information E406, and therefore makes a packet information retransmission E411 in the unreceived packet retransmission 44.

A black solid circle F in the unreceived packet retransmission 44 denotes the packet information F407 in the retransmission frame cycle T. The transmitting apparatus 41 has not received ACK information for the packet information F407, and therefore makes a packet information retransmission F412 in the unreceived packet retransmission 44.

Then, an ACK information reply 413 denoted by 48 for the pieces of packet information D410 and E411 is made from the receiving apparatus 42 to the transmitting apparatus 41.

Also on arrival of a re-retransmission frame cycle T denoting a predetermined packet re-retransmission 45, the transmitting apparatus 41 determines whether there are packets not received by the receiving apparatus 42, and then makes a re-retransmission 45 of unreceived packet information.

On arrival of the re-retransmission frame cycle T for the packet re-retransmission 45, the information transmitting apparatus 41 makes a re-retransmission 414 of packet information C whose ACK information has not been received.

Then, an ACK information reply 415 denoted by 49 in response to the retransmission 412 of the arrived packet information F and the re-retransmission 414 of the arrived packet information C is made from the receiving apparatus 42 to the transmitting apparatus 41.

The transmitting apparatus 41 receives the ACK information, whereby the transmitting apparatus 41 receives the ACK information for all of the pieces of packet information A to F, and the series of asynchronous information transmissions is completed.

FIG. 5 is a diagram illustrating a retransmission control method using a transmission pointer value at the end of a frame according to the present embodiment.

At an absolute frame number #71 in FIG. 5, both a transmission pointer and an ACK reception pointer indicate a value 100, meaning that there is no ACK-unreceived packet at this point.

Then, in a frame cycle of a frame number #72, one packet is transmitted and thereby the transmission pointer indicates 101; in a frame cycle of a frame number #73, four packets are transmitted and thereby the transmission pointer indicates 105; and in a frame cycle of a frame number #74, one packet is transmitted.

In a frame cycle of a frame number #75, no packet is transmitted, and therefore the transmission pointer continues to indicate 106.

In this cycle, because the packet 101 indicated by 55 was transmitted in a period from the frame #71 of four frames back to the frame #72 of three frames back indicated by 51, arrival of ACK information for the packet 101 is checked, and when the ACK information has not been received, the packet 101 is retransmitted.

Also in a frame cycle of a frame number #76, no packet is transmitted, and therefore the transmission pointer continues to indicate 106.

In this cycle, because the four packets 102 to 105 indicated by 55 were transmitted in a period from the frame #72 of four frames back to the frame #73 of three frames back indicated by 51, arrival of ACK information for the packets 102 to 105 is checked, and when the ACK information has not been received, only the corresponding packets are retransmitted.

Then, in a frame cycle of a frame number #77, two packets are transmitted and thereby the transmission pointer indicates 108. In this cycle, because the packet 106 indicated by 55 was transmitted in a period from the frame #73 of four frames back to the frame #74 of three frames back indicated by 51, arrival of ACK information for the packet 106 is checked, and when the ACK information has not been received, the packet 106 is retransmitted.

In a frame cycle of a frame number #78, no packet is transmitted, and therefore the transmission pointer continues to indicate 108. In this cycle, because no packet was transmitted in a period from the frame #74 of four frames back to the frame #75 of three frames back indicated by 51, no packet is retransmitted.

Also in a frame cycle of a frame number #79, no packet is transmitted, and therefore the transmission pointer continues to indicate 108. In this cycle, because the packet 101 indicated by 55 was retransmitted in a period from the frame #75 of four frames back to the frame #76 of three frames back indicated by 51, arrival of ACK information for the packet 101 is checked, and when the ACK information has not been received, the packet 101 indicated by 56 is re-retransmitted.

Then, in a frame cycle of a frame number #80, two packets are transmitted and thereby the transmission pointer indicates 110. In this cycle, because the packets 107 and 108 indicated by 55 were transmitted in a period from the frame #76 of four frames back to the frame #77 of three frames back indicated by 51, arrival of ACK information for the packets 107 and 108 is checked, and when the ACK information has not been received, the packets 107 and 108 are retransmitted.

In addition, because the four packets 102 to 105 indicated by 56 were transmitted in a period from the frame #72 of eight frames back to the frame #73 of seven frames back indicated by 52, arrival of ACK information for the packets 102 to 105 is checked, and when the ACK information has not been received, the packets 102 to 105 indicated by 56 are re-retransmitted.

Also in subsequent frame cycles of a frame number #81 to a frame number #88, according to the above rules, the packets indicated by 55 transmitted in a period from a frame number of four frames back to a frame number of three frames back indicated by 51 are retransmitted; the packets indicated by 56 transmitted in a period from a frame number of eight frames back to a frame number of seven frames back indicated by 52 are re-retransmitted; and the packets indicated by 57 transmitted in a period from a frame number of twelve frames back to a frame number of eleven frames back indicated by 53 are re-re-retransmitted.

Also, an example will be shown in which a packet whose ACK information has not been received after three retransmissions in the past 16 frames is discarded on arrival of a frame number #87.

In this case, the packet 101 indicated by 57 was re-re-retransmitted in the frame number #83 of four frames back indicated by 53, the packet 101 indicated by 56 was re-retransmitted in the frame number #79 of eight frames back indicated by 52, and the packet 101 indicated by 55 was retransmitted in the frame number #75 of twelve frames back indicated by 51. However, because ACK information of the packet 101 of sixteen frames back indicated by 54 has not been received yet, the packet 100 indicated by 58 is deleted on arrival of the frame number #87, and an upper layer that has made a request for the transmission of the packet is notified that the transmission of the packet is not possible.

Similarly, when a frame number #88 arrives, three retransmissions have been made during the past 16 frames; that is, the packets 102 to 105 indicated by 57 was re-re-retransmitted in the frame number #84 of four frames back indicated by 53, the packets 102 to 105 indicated by 56 was re-retransmitted in the frame number #80 of eight frames back indicated by 52, and the packets 102 to 105 indicated by 55 was retransmitted in the frame number #76 of twelve frames back indicated by 51. However, because ACK information of the packets 102 to 105 of sixteen frames back indicated by 54 has not been received yet, the packet 101 indicated by 59 is deleted on arrival of the frame number #88, and the upper layer that has made a request for the transmission of the packet is notified that the transmission of the packet is not possible.

It is to be noted that while an example of operation performed in each frame cycle is taken to describe a concrete example of the present embodiment, the present invention is not limited to the handling of transmission pointer information in each frame cycle; a method of handling the transmission pointer information in a cycle of a few milliseconds, for example, may be used as a method for applying the present invention to a radio transmission line with no frame cycle.

Figure 6:
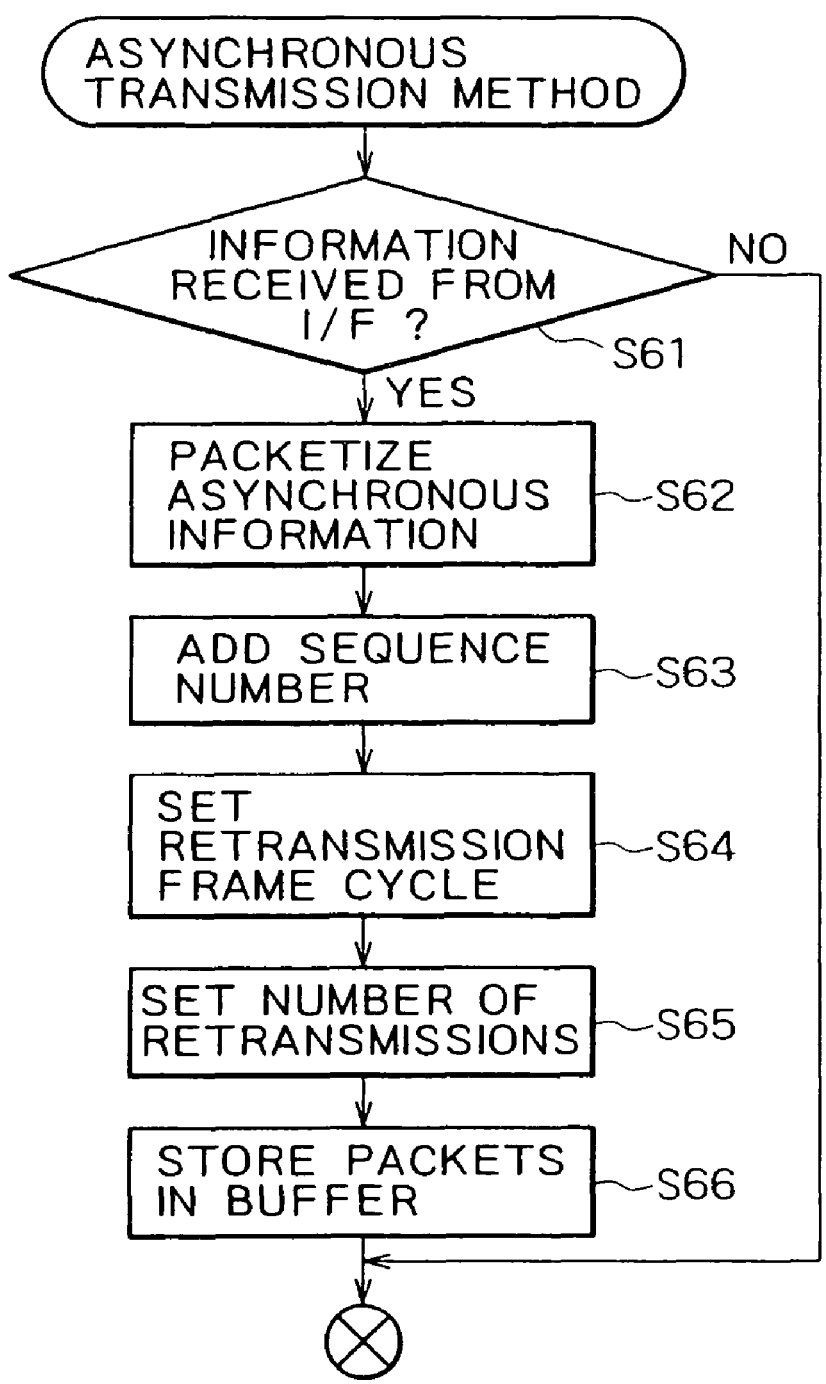
FIG. 6 is a flowchart of asynchronous transmission.

FIG. 6 is a flowchart of an asynchronous transmission method.

At a step S61 in FIG. 6, whether a request for transmission of asynchronous information is received by the interface unit 25 shown in FIG. 2 is determined.

When the request for transmission of asynchronous information is not received at the step S61, processing from a branch of NO is omitted. When the request for transmission of asynchronous information is received, the information conversion processing unit 24 shown in FIG. 2 packetizes the asynchronous information into predetermined fragment units at a step S62 from a branch of YES. At a step S63, the information conversion processing unit 24 shown in FIG. 2 adds a sequence number to each of the packets. At a step S64, the control unit 26 shown in FIG. 2 sets a frame cycle for retransmission of the packets. At a step S65, the control unit 26 sets the number of retransmissions. At a step S66, packets transmissible by one access control are stored in the transmission buffer 23B shown in FIG. 2.

It is to be noted that the present embodiment can set these parameters as arbitrary values. Specifically, the present embodiment can set retransmission frame cycles such as a first retransmission frame cycle, a second retransmission frame cycle, a third retransmission frame cycle, and so on arbitrarily.

Figure 7:
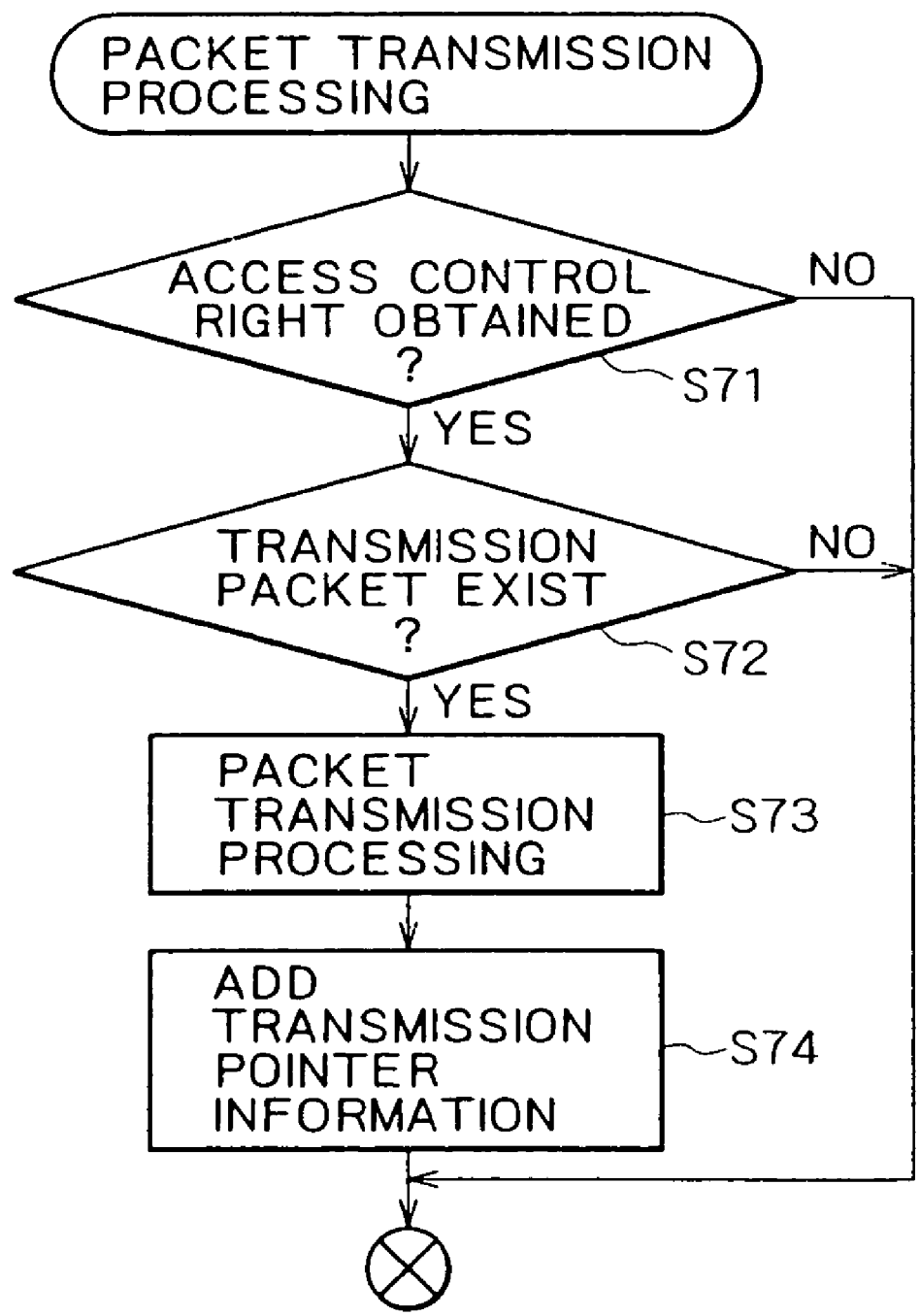
FIG. 7 is a flowchart of packet transmission processing.

FIG. 7 is a flowchart of a packet transmission processing method.

At a step S71 in FIG. 7, whether an access control right of a radio transmission line is received by the apparatus of the radio transmission processing unit 22 shown in FIG. 2 is determined.

When the access control right is not received at the step S71, processing from a branch of NO is omitted. When the access control right is received, whether there are transmission packets is determined at a step S72 from a branch of YES.

When there are no transmission packets at the step S72, processing from a branch of NO is omitted. When there are transmission packets, the packets stored in the transmission buffer 23B shown in FIG. 2 are transmitted at a step S73 from a branch of YES.

At a step S74, transmission pointer information is updated, and the transmission pointer information is stored in the control information memory 27 shown in FIG. 2, whereby the packet transmission processing is ended.

Figure 8:
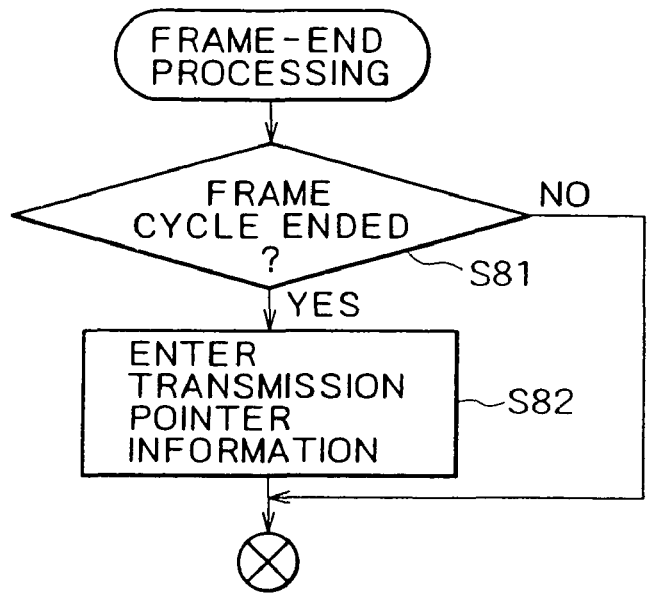
FIG. 8 is a flowchart of processing at an end of a frame.

FIG. 8 is a flowchart of processing at an end of a frame.

At a step S81 in FIG. 8, the control unit 26 shown in FIG. 2 determines whether an end of a predetermined frame cycle is detected. When the frame cycle is ended, last transmission pointer information in the frame cycle is entered in the control information memory 27 shown in FIG. 2 at a step S82.

Figure 9:
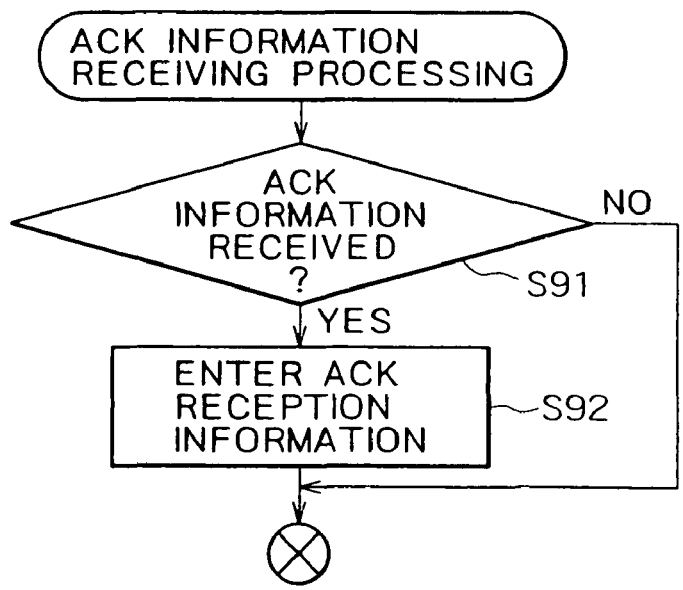
FIG. 9 is a flowchart of processing for receiving receipt acknowledging (ACK) information.

FIG. 9 is a flowchart of processing at the time of receiving ACK information.

At a step S91 in FIG. 9, the control unit 26 shown in FIG. 2 determines whether reception of ACK information directed to its station is detected. When the ACK information is received, ACK sequence number information of a packet entered in the ACK information is entered as ACK reception information at a step S92.

Figure 10:
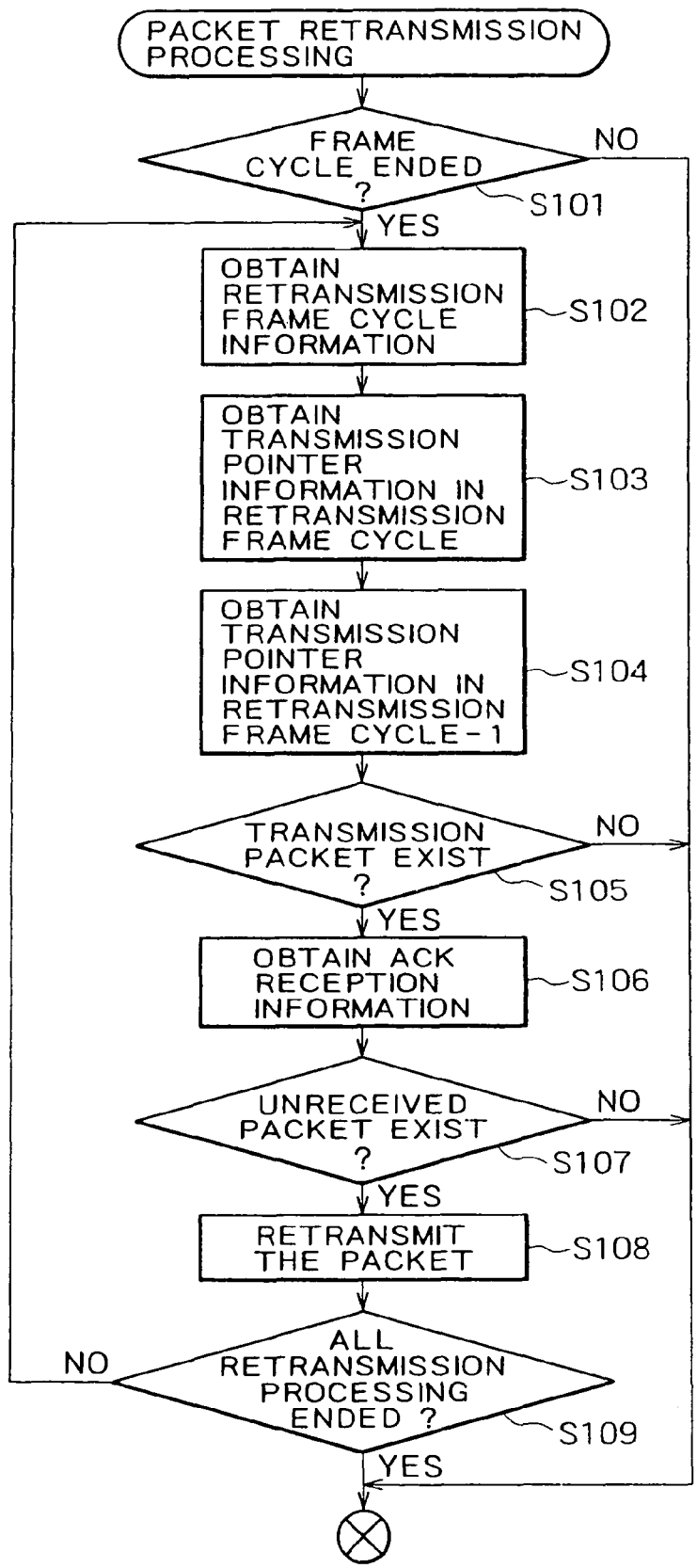
FIG. 10 is a flowchart of packet retransmission processing.

FIG. 10 is a flowchart of packet retransmission processing.

At a step S101 in FIG. 10, the control unit 26 shown in FIG. 2 determines whether an end of a predetermined frame cycle is detected. When the frame cycle is ended, a fourth frame cycle, an eighth frame cycle, and a twelfth frame cycle, for example, are obtained as retransmission frame cycle setting information at a step S102. At a step S103, transmission pointer information in the retransmission frame cycle is obtained from the control information memory 27 shown in FIG. 2. At a step S104, set information of a frame immediately preceding the retransmission frame cycle is obtained.

At a step S105, a difference between these pieces of information is obtained to determine whether there are packets that need to be retransmitted. When there are such packets, ACK information is obtained from the control information memory 27 shown in FIG. 2 at a step S106. At a step S107, the control unit 26 shown in FIG. 2 determines whether there are packets whose ACK information has not been received. When there are packets whose ACK information has not been received, only the packets whose ACK information has not been received are stored from the buffer memory 23A into the transmission buffer 23B shown in FIG. 2, and then retransmitted at a step S108.

Then, at a step S109, whether processing for another retransmission frame cycle, for example the eighth frame cycle or the twelfth frame cycle is to be performed is determined. When retransmission processing is necessary, the processing returns to the step S102 to perform packet retransmission processing. When retransmission processing for all the frame cycles, that is, the fourth frame cycle, the eighth frame cycle, and the twelfth frame cycle has been performed, the series of processing steps is ended.

Figure 11:
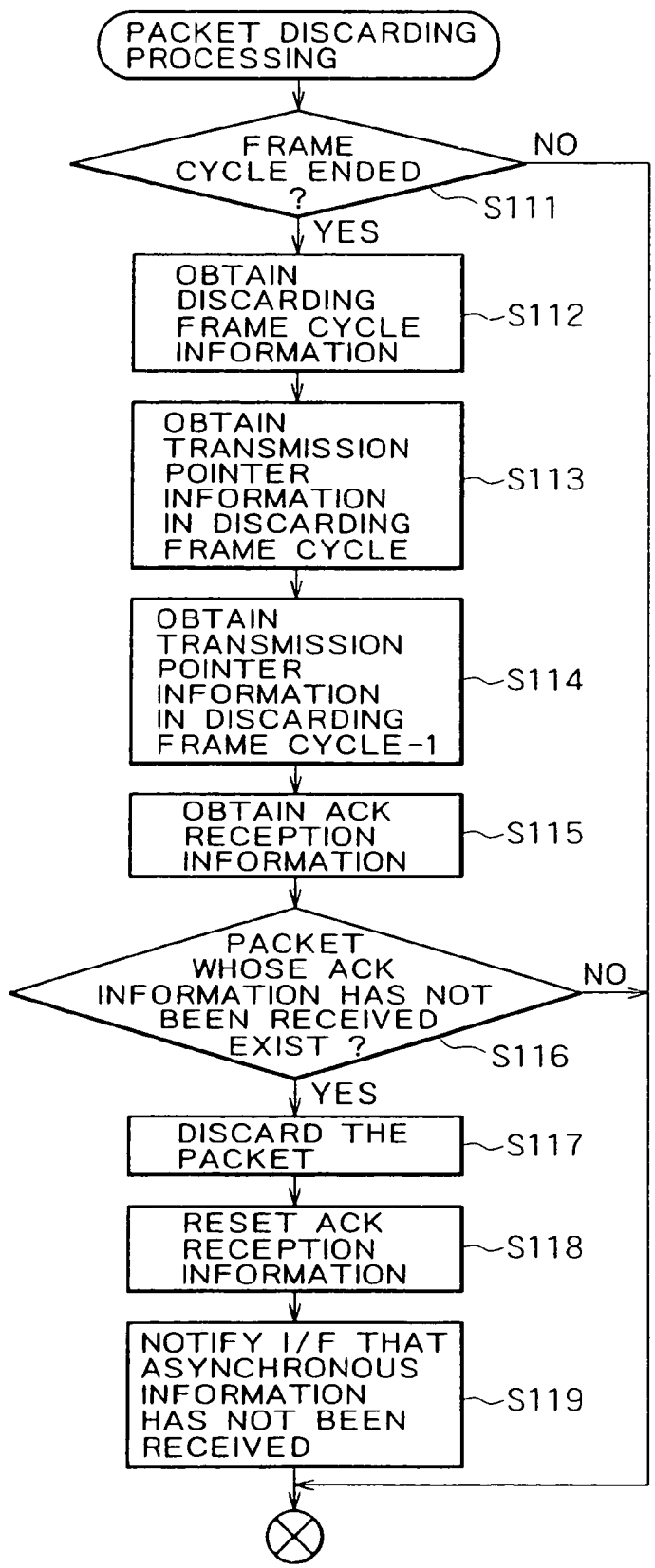
FIG. 11 is a flowchart of processing for discarding a packet.

FIG. 11 is a flowchart of processing for discarding a packet.

At a step S111 in FIG. 11, the control unit 26 shown in FIG. 2 determines whether an end of a predetermined frame cycle is detected. When the frame cycle is ended, a sixteenth frame cycle, for example, is obtained as discarding frame cycle setting information at a step S112. At a step S113, transmission pointer information in the discarding frame cycle is obtained from the control information memory 27 shown in FIG. 2. At a step S114, set information of a frame immediately preceding the discarding frame cycle is obtained. At a step S115, ACK reception information is obtained.

At a step S116, the control unit 26 shown in FIG. 2 determines whether there are packets whose ACK information has not been received. When there are packets whose ACK information has not been received, packets whose ACK information has not been received are discarded from the buffer memory 23A shown in FIG. 2 at a step S117.

At a step S118, the ACK information is reset. At a step S119, the interface unit 25 shown in FIG. 2 is notified that the asynchronous information has not been received, whereby the series of processing steps is ended.

Figure 12:
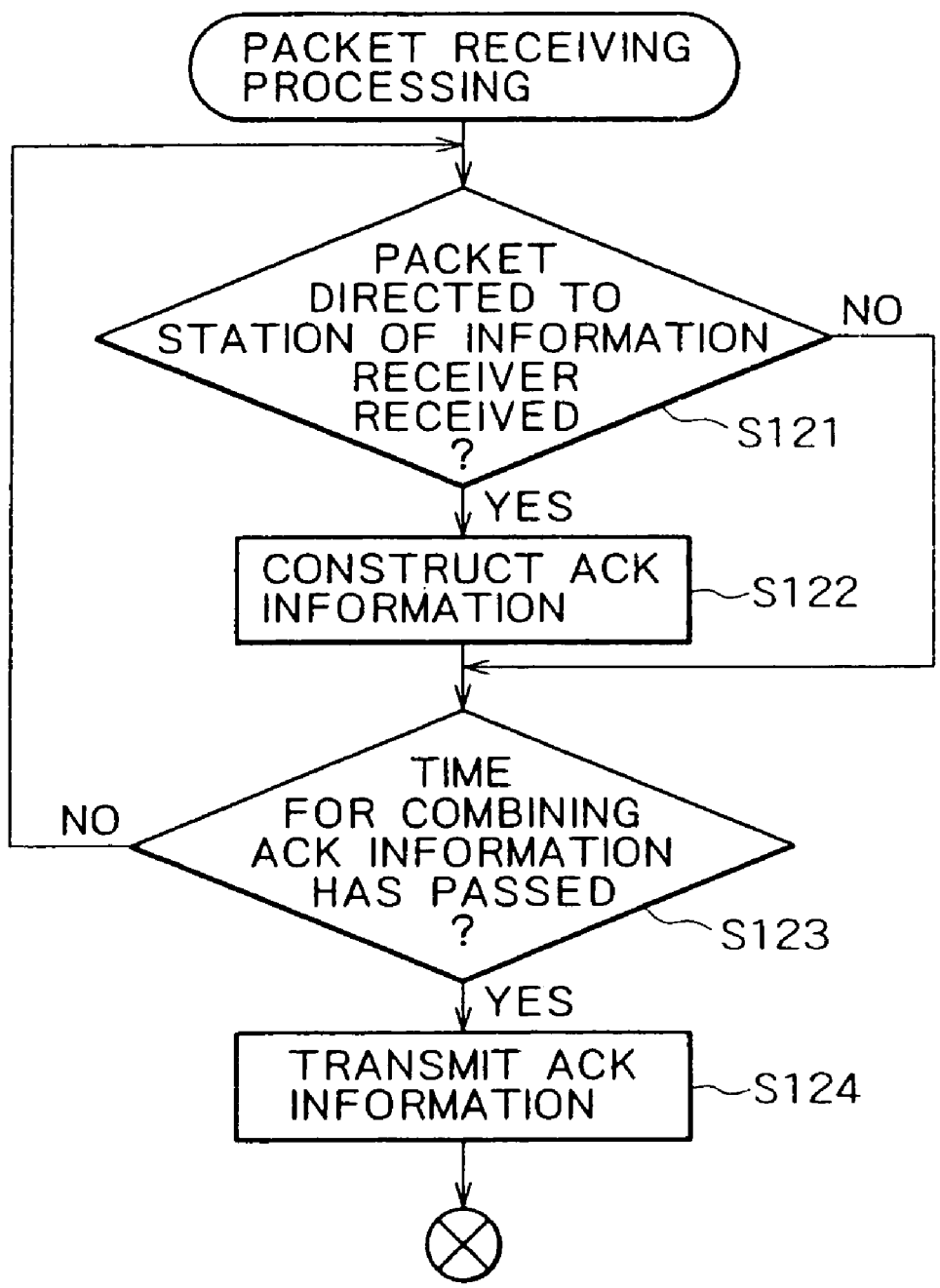
FIG. 12 is a flowchart of processing for receiving a packet.

FIG. 12 is a flowchart illustrating packet reception processing by a transmission apparatus serving as an information receiver.

In this case, it is supposed that a plurality of pieces of ACK information are combined into one ACK packet as an ACK information reply within a time period that does not exceed a retransmission frame cycle, and the packet is returned to an information transmitter. However, the present invention is not limited to this method; an ACK information reply may be made for each packet received.

At a step S121 in FIG. 12, whether a packet directed to the station of the information receiver is received is determined. When a packet directed to the station of the information receiver is received, ACK information is constructed at a step S122. When no packet directed to the station of the information receiver is received at the step S121, the processing proceeds to a step S123. At the step S123, whether a time for combining ACK information has passed is determined.

In this case, ACK information may be combined regularly in each cycle of two frames, for example. When the time has not passed at the step S123, the processing returns from a branch of NO to the step S121 to detect reception of packets directed to the station. When the time has passed, ACK information that has been stored is returned to the information transmitter at a step S124 from a branch of YES.

While the present embodiment has been described above by taking a concrete example of setting retransmission timing such as the fourth frame cycle, the eighth frame cycle, and the twelfth frame cycle, and setting discarding timing such as the sixteenth frame cycle, the present invention is not limited to this example, and other timing may be set.

While a preferred embodiment of the present invention has been described using specific terms, such description is for illustrative purposes only, and it is to be understood that changes and variations may be made without departing from the spirit or scope of the following claims.

What is claimed is:

1. A radio transmission apparatus for transmitting information in a wireless network, said wireless network being formed with a plurality of communication apparatuses serving as communication stations, said radio transmission apparatus comprising:
   packetizing means for dividing asynchronous information into information packets as predetermined information units on said wireless network;
   transmitting means for transmitting said information packets under predetermined access control;
   frame cycle setting means for setting a predetermined transmission frame cycle;
   transmission pointer recording means for recording a sequence number of a last packet transmitted in said predetermined transmission frame cycle as a transmission pointer value of said predetermined transmission frame cycle;
   receiving means for receiving an acknowledgment information packet from a radio transmission apparatus serving as an information receiver, wherein said acknowledgement information packet includes a plurality of pieces of acknowledgement information combined during more than one transmission frame cycle;
   timing means for timing said predetermined transmission frame cycle;
   retransmission frame cycle setting means for presetting a frame cycle for retransmission;
   control means for determining whether any packets are candidates for retransmission based on the transmission pointer value when said frame cycle for retransmission arrives, and if any packets are candidates for retransmission, the control means further identifying an information packet whose acknowledgment information has not been received when the frame cycle for retransmission arrives; and
   retransmitting means for automatically retransmitting only the information packet whose acknowledgment information has not been received by the time said frame cycle arrives for retransmission.

2. A radio transmission apparatus for transmitting information in a wireless network, said wireless network being formed with a plurality of communication apparatuses serving as communication stations, said radio transmission apparatus comprising:
   packetizing means for dividing asynchronous information into information packets as predetermined information units on said wireless network;
   transmitting means for transmitting said information packets under predetermined access control and transmitting a notification that transmission of an information packet is not possible;
   receiving means for receiving an acknowledgement packet from a radio transmission apparatus serving as an information receiver, wherein said acknowledgement packet includes a plurality of pieces of acknowledgement information combined during more than one transmission frame cycle;
   frame cycle setting means for setting a predetermined transmission frame cycle;
   transmission pointer recording means for recording a sequence number of a last packet transmitted in said predetermined transmission frame cycle as a transmission pointer value of said predetermined transmission frame cycle;
   timing means for timing said predetermined transmission frame cycle;
   discarding frame cycle setting means for presetting a frame cycle to discard information packets; and
   control means for determining whether any packets are candidates for discarding based on the transmission pointer value at the time of said frame cycle to discard information packets, and if any packets are candidates for discarding, the control means further identifying an information packet whose acknowledgment information has not been received when the frame cycle to discard information packets arrives;
   discarding means for discarding the information packet for which no acknowledgement information has been received when the frame cycle to discard information packets arrives.

3. A radio transmission method for transmitting an information packet from a radio transmission apparatus serving as an information transmitter to a radio transmission apparatus serving as an information receiver, said radio transmission method comprising the steps of:
   setting a predetermined transmission frame cycle;
   presetting a frame cycle for retransmission;
   transmitting information over a wireless network, said wireless network being formed with a plurality of transmission apparatuses serving as communication stations;
   entering a sequence number of a last packet transmitted in said predetermined transmission frame cycle as a transmission pointer value of said predetermined transmission frame cycle;
   receiving an acknowledgement packet constructed from a plurality of pieces of acknowledgement information combined during more than one predetermined transmission frame cycle;
   determining whether any packets are candidates for retransmission based on the transmission pointer value when the frame cycle for retransmission arrives;
   if it is determined that any packets are candidates for retransmission, identifying an information packet whose acknowledgment information has not been received when the frame cycle for retransmission arrives,
   automatically retransmitting only the information packet for which no acknowledgement information has been received before a time for the frame cycle for retransmission.

4. The radio transmission method according to claim 3, wherein a predetermined number of retransmissions is set, and then retransmission of a packet is made for no more than said predetermined number of retransmissions.

5. The radio transmission method according to claim 3, wherein a frame cycle for discarding unreceived information packets, and a packet is discarded when receipt acknowledging information is not returned by the time of said frame cycle for discarding unreceived information packets.

6. The radio transmission method according to claim 3, wherein said acknowledgement packet is generated within a time period that does not exceed said retransmission frame cycle.

* * * * *